US010127420B2

(12) United States Patent
Ti et al.

(10) Patent No.: US 10,127,420 B2
(45) Date of Patent: Nov. 13, 2018

(54) LOCATION BASED SITUATION AWARENESS SYSTEM AND METHOD THEREOF

(71) Applicant: INDUSTRIAL TECHNOLOGY RESEARCH INSTITUTE, Hsinchu (TW)

(72) Inventors: Santiago Jose Cuadrado Ti, New Taipei (TW); Min-Hao Li, Hsinchu County, TN (US); Cheng-Chen Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 20 days.

(21) Appl. No.: 15/388,173

(22) Filed: Dec. 22, 2016

(65) Prior Publication Data

US 2018/0039804 A1 Feb. 8, 2018

Related U.S. Application Data

(60) Provisional application No. 62/371,185, filed on Aug. 4, 2016.

(30) Foreign Application Priority Data

Dec. 14, 2016 (TW) .............................. 105141419 A

(51) Int. Cl.
*G06K 7/10* (2006.01)
*H04L 29/08* (2006.01)
(Continued)

(52) U.S. Cl.
CPC ........ *G06K 7/10386* (2013.01); *H04L 67/125* (2013.01); *H04L 67/141* (2013.01);
(Continued)

(58) Field of Classification Search
CPC .... H04L 67/141; H04L 67/26; G06K 7/32128
See application file for complete search history.

(56) References Cited

U.S. PATENT DOCUMENTS

| 7,325,728 B2 | 2/2008 | Arora et al. |
| 7,605,688 B1 | 10/2009 | Seah |

(Continued)

FOREIGN PATENT DOCUMENTS

| CN | 204288436 U | 4/2015 |
| CN | 103270735 B | 4/2016 |

(Continued)

OTHER PUBLICATIONS

Shin-You Di, et al., "Delivering Location Based Industrial Situational Awareness Using Web and RFID Technologies." Journal of the Mechatronic Industry, vol. 401, Aug. 2016, 11 pages.

(Continued)

*Primary Examiner* — Kabir A Timory
(74) *Attorney, Agent, or Firm* — Muncy, Geissler, Olds & Lowe, P.C.

(57) ABSTRACT

A location based situation awareness system comprises: an antenna located on the processing machine, the antenna is configured to generate a wireless field; an interrogator coupled to the antenna; an identification tag located on the mobile device, the interrogator is configured to scan the identification tag in the wireless field; a data collector located on the processing machine, the data collector is configured to collect a real-time data of the processing machine; and a broker server coupled to the interrogator and the data collector, the broker server is configured to update the real-time data of the processing machine into the mobile device having the identification tag in the wireless field.

21 Claims, 4 Drawing Sheets

(51) Int. Cl.
*H04W 4/80* (2018.01)
*H04B 5/00* (2006.01)

(52) U.S. Cl.
CPC ............. *H04L 67/18* (2013.01); *H04L 67/26*
(2013.01); *H04B 5/0062* (2013.01); *H04L*
*67/02* (2013.01); *H04W 4/80* (2018.02)

(56) References Cited

U.S. PATENT DOCUMENTS

| | | | |
|---|---|---|---|
| 8,718,688 | B2 | 5/2014 | Shaheen et al. |
| 8,750,145 | B2 | 6/2014 | Shaheen |
| 8,825,223 | B2 | 9/2014 | Carney et al. |
| 9,077,687 | B2 | 7/2015 | Bugenhagen |
| 9,258,705 | B2 | 2/2016 | Kang et al. |
| 9,324,236 | B2 | 4/2016 | Estkowski et al. |
| 9,326,173 | B2 | 4/2016 | Luft |
| 9,332,549 | B2 | 5/2016 | Lu et al. |
| 9,344,830 | B2 | 5/2016 | Ballot et al. |
| 2002/0181501 | A1 | 12/2002 | Nova et al. |
| 2007/0075873 | A1 | 4/2007 | Yang et al. |
| 2008/0278328 | A1 | 11/2008 | Chand et al. |
| 2011/0199905 | A1 | 8/2011 | Pinheiro et al. |
| 2011/0231568 | A1 | 9/2011 | Bansal et al. |
| 2011/0252235 | A1 | 10/2011 | Dolan et al. |
| 2011/0265158 | A1 | 10/2011 | Cha et al. |
| 2011/0285502 | A1* | 11/2011 | Steinmetz ............ G06K 7/0008 340/5.61 |
| 2012/0252481 | A1 | 10/2012 | Anpat et al. |
| 2014/0122642 | A1 | 5/2014 | Hughes et al. |
| 2014/0282015 | A1 | 9/2014 | Nixon et al. |
| 2015/0012332 | A1 | 1/2015 | Papachristos |
| 2015/0055640 | A1 | 2/2015 | Wang et al. |
| 2015/0106196 | A1* | 4/2015 | Williams ............ G06Q 20/227 705/14.51 |
| 2016/0112824 | A1 | 4/2016 | Tuset Peiro et al. |

FOREIGN PATENT DOCUMENTS

| | | |
|---|---|---|
| TW | 200720870 A | 6/2007 |
| TW | 200827040 A | 7/2008 |
| TW | 200939296 A | 9/2009 |
| TW | 201135381 A | 10/2011 |
| TW | 201411763 A | 3/2014 |
| TW | 201426227 A | 7/2014 |
| TW | 201541206 A | 11/2015 |
| TW | M523128 U | 6/2016 |
| WO | WO 2015101451 A1 | 7/2015 |

OTHER PUBLICATIONS

Yu-Chee Tseng, et al., "Location Awareness in Ad Hoc Wireless Mobile Networks." Computer, vol. 4, Jun. 2001, pp. 46-52.
Louise Barkuus, et al., "Location-Based Services for Mobile Telephony: a Study ot Users' Privacy Concerns." Jul. 2003, Proceedings of the INTERACT 2003, 9th IFIP TC13 International Conference on Human-Computer Interaction, 5 pages.
Flight Operations Briefing Notes, Human Performance, Enhancing Situation Awareness, AIRBUS, 11 pages, Jul. 2007
N. A. Stanton, et al., "Situational awareness and safety." Safety Science, vol. 39 2001, pp. 189-204.
M. R. Endsley, "Toward a Theory of Situation Awareness in Dynamic Systems." Human Factors, vol. 37, Issue 1, 1995, pp. 32-64.
Kathryn Zickuhr, "Location-Based Services." Sep. 12, 2013, 25 pgs, <http://pewinternet.org/Reports/2013/Location.aspx>.

* cited by examiner

LOCATION BASED SITUATION AWARENESS SYSTEM AND METHOD THEREOF

CROSS REFERENCE TO RELATED APPLICATION

This application claims the priority benefits of U.S. provisional application No. 62/371,185, entitled "LOCATION BASED SITUATION AWARENESS SYSTEM AND METHOD THEREOF", and filed in the United States Patent and Trademark Office on Aug. 4, 2016. This application also claims the priority benefits of Taiwan application No. 105141419 filed on Dec. 14, 2016. The entirety of which is incorporated by reference herein.

TECHNICAL FIELD

The disclosure relates to a location based situation awareness system and method thereof.

BACKGROUND

In a factory, it is important for operators or management staffs to instantly understand operating status of processing machines. As such, information and data of the processing machines need to be easily and correctly delivered to the operators. In general, the operators manually login the processing machines and export process data. Later, the process data is drawn into diagrams by the operators. Those procedures may be time-consuming and inefficient. In addition, it is hard to visualize the process data. Therefore, it is inconvenient for the operators to understand and handle the status of production lines immediately.

SUMMARY

The present disclosure provides a location based situation awareness system adapted to a processing machine monitored by a mobile device. The location based situation awareness system comprises: an antenna located on the processing machine, wherein the antenna is configured to generate a wireless field; an interrogator coupled to the antenna; an identification tag located on the mobile device, wherein the interrogator is configured to scan the identification tag in the wireless field; a data collector located on the processing machine, wherein the data collector is configured to collect a real-time data of the processing machine; and a broker server coupled to the interrogator and the data collector, wherein the broker server is configured to update the real-time data of the processing machine into the mobile device having the identification tag in the wireless field.

The present disclosure provides a location based situation awareness method adapted to a processing machine monitored by a mobile device. The location based situation awareness method comprises: creating a wireless field around the processing machine; by using an identification tag, verifying the mobile device having the identification tag in the wireless field; and by using a websocket connection, pushing a real-time data of the processing machine to the mobile device having the identification tag in the wireless field.

DETAILED DESCRIPTION OF DISCLOSED EMBODIMENTS

The present disclosure provides a location based situation awareness system and the method thereof. By using the location based situation awareness system, positions of users are automatically sensed without manually switching. Further, information and operating status of the processing machines are pushed to the users according to the positions of users. The system also provides users with bilateral monitoring and controlling for the processing machines. By using web technologies such as the websocket communication protocol and the responsive web design (RWD), status of the processing machines may be instantly updated to web pages or browsers. Through the web pages or the browsers, the information of the processing machines may be quickly delivered to the users. As long as mobile devices connect to the interne and by using identification tags on the mobile devices, information displayed on the web pages of the mobile devices will be automatically redirected and changed as the users move. Current operating status and statistical information of the processing machines are correctly displayed on the web pages of the mobile devices. There is no need for users to manually select and login current machines, which may be troublesome and time-consuming. The users may focus on the interpretation of useful information. In addition, the users may quickly understand the operating status of the production line/plant and make immediate judgments.

Figure 1:
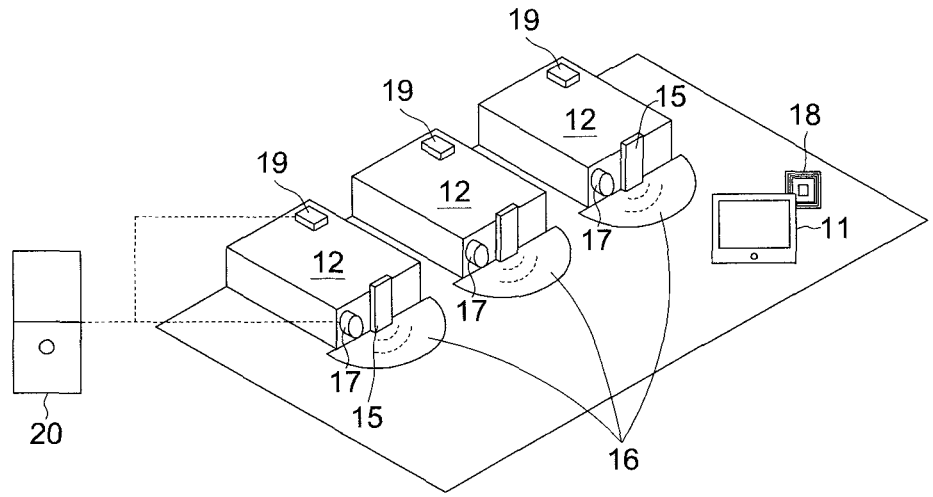
FIG. 1 is a diagram illustrating a location based situation awareness system in accordance with an embodiment of the present disclosure.

FIG. 1 is a diagram illustrating a location based situation awareness system 100 in accordance with an embodiment of the present disclosure. In an embodiment, a location based situation awareness system 100 is adapted to processing machines 12 monitored by a mobile device 11. The location based situation awareness system 100 comprises: antennas 15 located on the processing machines 12, wherein the antennas 15 are configured to generate wireless fields 16; interrogators 17 coupled to the antennas 15; an identification tag 18 located on the mobile device 11, wherein the interrogators 17 are configured to scan the identification tag 18 in the wireless fields 16; data collectors 19 located on the processing machines 12, wherein the data collectors 19 are configured to collect real-time data (such as process temperature, pressure, flow, vacuum, any physical data, and abnormal returns) of the processing machines 12; and a broker server 20 coupled to the interrogators 17 and the data collectors 19, wherein the broker server 20 is configured to update the real-time data of the processing machines 12 into the mobile device 11 having the identification tag 18 in the wireless fields 16.

In an embodiment, an antenna 15 generates a wireless field 16. The antenna 15 connects to an interrogator 17.

When the interrogator 17 senses the mobile device 11 entering into the wireless field 16, the interrogator 17 sends information of "verified" identification tag 18 to the broker server 20. The so-called "verified" identification tag 18 indicates that the identification tag 18 has been verified by the broker server 20. In practice, multiple identification tags in the wireless field 16 are scanned. Or even invalid tags and noises are also scanned. The interrogator 17 will determine whether those tags are qualified. Later, the interrogator 17 notifies the broker server 20 about information of the identification tag 18. In practice, the identification tag 18 may be simultaneously scanned by several interrogators 17 or other interrogators. The interrogators 17 will judge which processing machines 12 are closest to the identification tag 18. Further, a location information of the identification tag 18 is transmitted to the broker server 20. Therefore, the mobile device 11 will receive real-time data of one corresponding processing machine 12 that is pushed from the broker server 20. If there are multiple "verified" identification tags in one wireless field 16 at the same time, multiple mobile devices may receive the same real-time data from the same processing machine 12. In an embodiment, the interrogators 17 are configured to inform the broker server 20 about a location information of the identification tag 18. The broker server 20 realizes which processing machines 12 that the mobile device 11 is entering. The broker server 20 pushes web pages of one corresponding processing machine 12 to the mobile device 11. The antennas 15 and interrogators 17 may be suitable wireless communication technologies such as radio frequency identification (RFID), Bluetooth, or near field communication (NFC), but the suitable wireless communication technologies are not limited to the aforesaid techniques.

In an embodiment, the identification tag 18 is a radio frequency identification tag. The antennas 15 and the interrogators 17 are based on standards of wireless radio frequency identification. The interrogators 17 may be performed by systems on a chip. In practice, the identification tag 18 is attached on the mobile device 11. In an embodiment, when a user uses the identification tag 18 for the first time, the user will enter the browser of the mobile device 11 to register identification codes of the identification tag 18. For the subsequent use by the user, the broker server 20 will actively release the registered identification tag 18.

In an embodiment, the broker server 20 comprises an ethernet interface (not shown). The ethernet interface is configured to connect an ethernet. The broker server 20 has an internet protocol address (IP Address) to facilitate connections with other devices. For example, it facilitates connections between the broker server 20 and interrogators 17 or facilitates connections between the broker server 20 and the data collectors 19. In an embodiment, the broker server 20 is based on a websocket communication protocol, wherein the websocket communication protocol is a type of full-duplex communication on a single transmission control protocol (TCP) connection. The websocket communication protocol enables the data interchange between instruments (herein referred to as the interrogators 17, the data collectors 19, or the mobile device 11) and the broker server 20 to become more simple. The websocket communication protocol allows the broker server 20 to communicate and directly push data to the mobile device 11 having a verified identification tag 18 without requiring the request by users. The mobile device 11 having the identification tag 18 is verified in advance. Once a hand shaking between the browser of the mobile device 11 and the broker server 20 is finished, sustainable or continuous connections between them are established. The sustainable or continuous connections allow bidirectional transmission of data. The broker server 20 actively pushes real-time data of the processing machines 12 to the mobile device 11. The broker server 20 supports browsers of the mobile device 11, such as Chrome, Internet Explorer (IE), Firefox, Safari, and Opera. In addition, a length of the packet header exchanged between the broker server 20 and instruments is short, which is about two bytes. Therefore, the packet header will not occupy too many bandwidths and server resources. In comparison, under a polling technique, hypertext transfer protocol requests (HTTP requests) are sent from browsers to servers in a specific time interval (such as every 1 second). Later, the servers return the latest data to the browsers of clients. When using the polling technique, the browsers have to constantly make requests to the servers. However, the HTTP requests have longer packet headers, which will occupy more bandwidths and server resources.

In an embodiment, the data collector 19 further comprises an ethernet interface (not shown), wherein the ethernet interface is configured to connect an ethernet; and at least one sensor (not shown), wherein the at least one sensor is configured to retrieve real-time data of the processing machines 12. Through the ethernet, the data collector 19 connects the broker server 20 by using a websocket connection. The at least one sensor detects physical parameters or production conditions of the processing machines 12, such as temperature, pressure, humidity, gas flow, vacuum, current, and voltage. The real-time data captured by the at least one sensor is transmitted to the broker server 20 through the websocket connection.

In practice, there are multiple processing machines 12 in the factory. An identification tag 18 is attached on a mobile device 11. When the mobile device 11 moves into a wireless field 16 of a corresponding processing machine 12, the broker server 20 will push web pages of the corresponding processing machine 12 to the mobile device 11. There are graphical real-time data of the corresponding processing machine 12 displayed on the web pages. The graphical real-time data may be, for example, a temperature bar graph and a pressure dashboard. When the mobile device 11 moves to another wireless field of a processing machine, the broker server 20 redirects web pages of the mobile device 11. The broker server 20 will push graphical real-time data of another processing machine to the mobile device 11.

Figure 2:
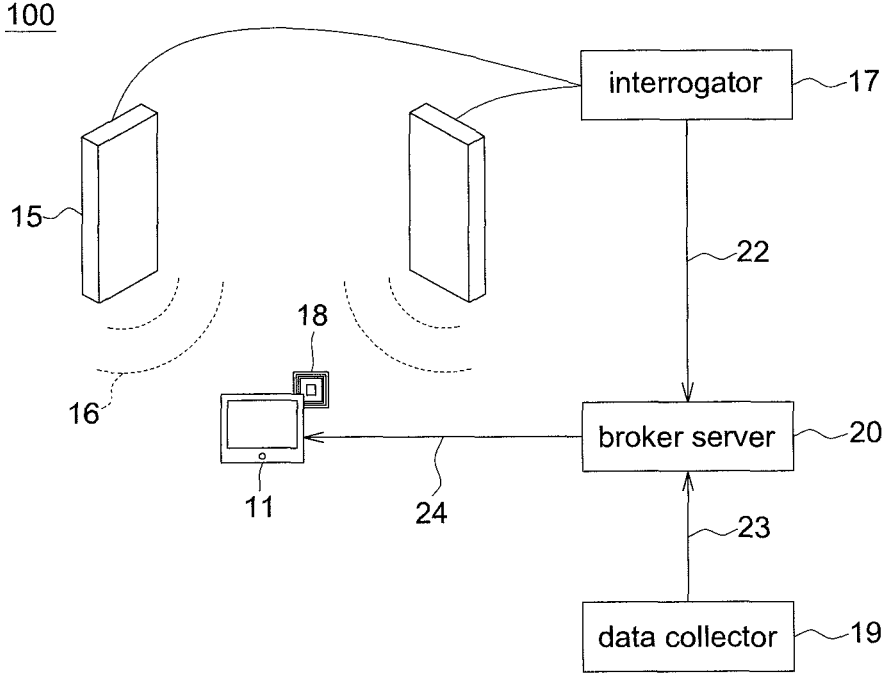
FIG. 2 is a framework diagram illustrating a location based situation awareness system in accordance with an embodiment of the present disclosure.

FIG. 2 is a framework diagram illustrating a location based situation awareness system 100 in accordance with an embodiment of the present disclosure. An antenna 15 generates a wireless field 16. An interrogator 17 connects the antenna 15. The interrogator 17 senses a mobile device 11 entering the wireless field 16. The interrogator 17 will scan an identification tag 18 on the mobile device 11. After scanning, the interrogator 17 provides a broker server 20 with a location information of the mobile device 11 (a message of entering which processing machines 12) and the identity information (for example, passwords of the identification tag 18). The location information is transmitted to the broker server 20 via a websocket connection 22. The data collector 19 constantly retrieves real-time data of the processing machines 12, and transmits the real-time data to the broker server 20 via a websocket connection 23. After the broker server 20 interprets a position of the mobile device 11, the broker server 20 pushes the real-time data of a corresponding processing machine 12 (the processing machine having the wireless field 16) to the mobile device 11. There is a websocket connection 24 between the broker server 20 and the mobile device 11.

Figure 3:
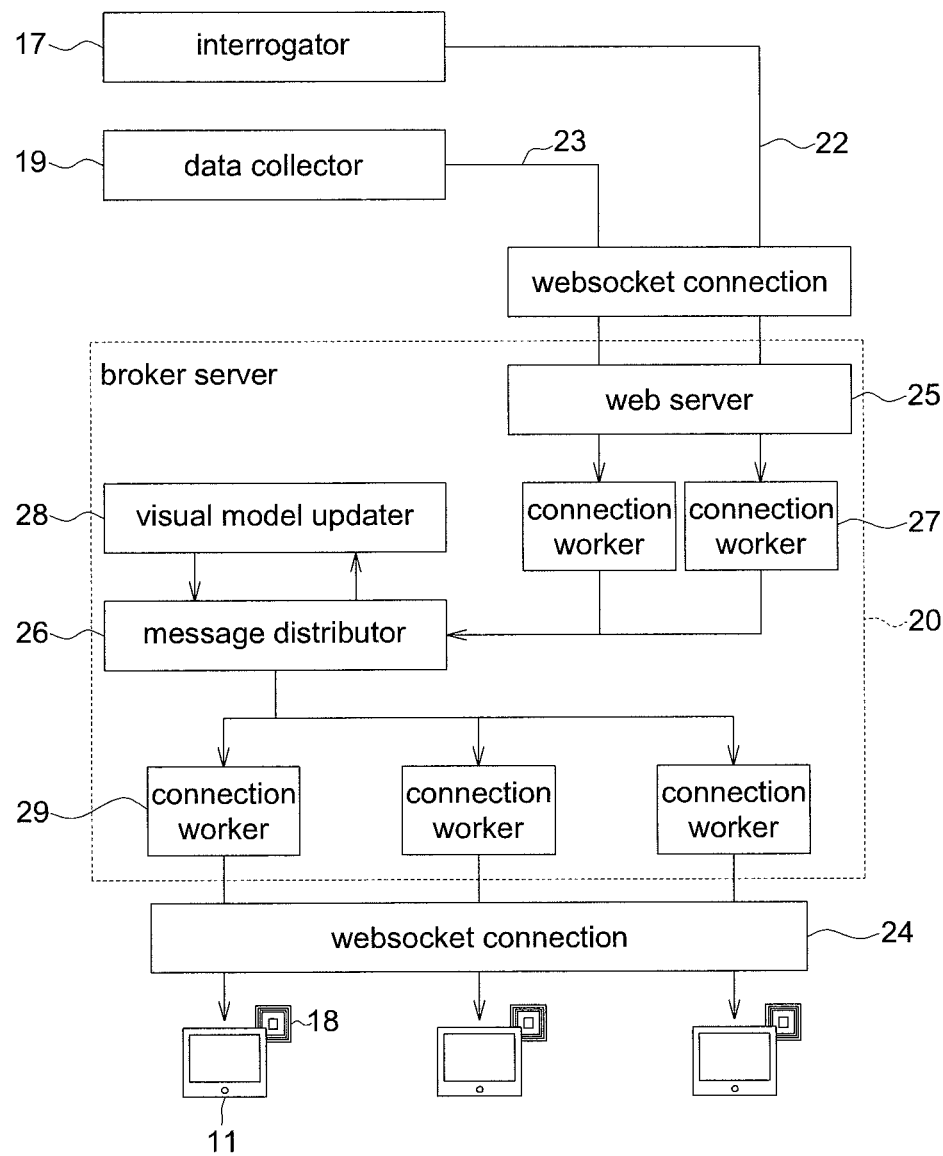
FIG. 3 is a diagram illustrating parts of framework of FIG. 2 in accordance with embodiments of the present disclosure.

FIG. 3 is a diagram illustrating parts of the framework of FIG. 2 in accordance with embodiments of the present disclosure. FIG. 3 illustrates internal framework of a broker server 20 in detail. In an embodiment, the broker server 20 further comprises a web server 25. The web server 25 is coupled to a data collector 19 and an interrogator 17. The web server 25 is configured to provide at least one web page to a mobile device 11 having an identification tag 18. There is a websocket connection 22 between the interrogator 17 and the web server 25. There is a websocket connection 23 between the data collector 19 and the web server 25. The grammar of the at least one web page may be designed by languages, such as hypertext markup language (HTML), cascading style sheets (CSS), or JavaScript. The at least one web page displays real-time data of a processing machine 12.

In an embodiment, the broker server 20 further comprises a message distributor 26. The message distributor 26 is coupled to the data collector 19 and the interrogator 17. The message distributor 26 is configured to receive real-time data of the processing machines 12. In addition, the message distributor 26 is configured to distribute the real-time data into the mobile device 11 having the identification tag 18 in a wireless field 16. The message distributor 26 may receive messages from a connection worker 27. The messages may be, for example, real-time data of the processing machines 12 coming from the data collector 19. The messages also may be information of the identification tag 18 coming from the interrogator 17. The message distributor 26 is based on an in-memory fan-out step, which allows multitasking for messages. The message distributor 26 interprets, via the interrogator 17, which processing machines 12 the identification tag 18 is located in. Further, the message distributor 26 allocates real-time data of a corresponding processing machine 12 to the mobile device 11 having the identification tag 18.

In an embodiment, the broker server 20 further comprises a connection worker 27. The connection worker 27 is located between the message distributor 26 and the data collector 19. The connection worker 27 is configured to filter and transmit real-time data of processing machines 12 into the message distributor 26. The connection worker 27 checks whether the real-time data is damaged or not. The connection worker 27 carries and transmits qualified real-time data to the message distributor 26.

In an embodiment, the broker server 20 further comprises a visual model updater 28. The visual model updater 28 is coupled to the data collector 19 indirectly. The visual model updater 28 is coupled to the message distributor 26 directly. The visual model updater 28 is configured to transform real-time data of processing machines 12 into a human machine interface (HMI). The human machine interface comprises graphs and dashboards. For example, physical parameters of the processing machines 12 are drawn into bar graphs, or the real-time data of the processing machines 12 is drawn into the dashboards. The graphs and dashboards help users to immediately monitor conditions of processing machines 12. In an embodiment, formats of real-time data are based on javascript object notation reports (JSON reports). The JSON reports are synchronized with the visual model updater 28. Any changes to the JSON reports are immediately updated to the human machine interface. In an embodiment, the human machine interface is established on at least one web page so that the human machine interface is compatible to the web server 25.

In an embodiment, the broker server 20 further comprises a connection worker 29. The connection worker 29 is located between the message distributor 26 and a mobile device 11 having an identification tag 18. The connection worker 29 is configured to transmit the human machine interface to the mobile device 11 having the identification tag 18 in a wireless field 16. The connection worker 29 assists the message distributor 26 to push the human machine interface to the mobile device 11. By using the websocket connection 24, the connection worker 29 communicates with the mobile device 11 for data transmission.

Figure 4:
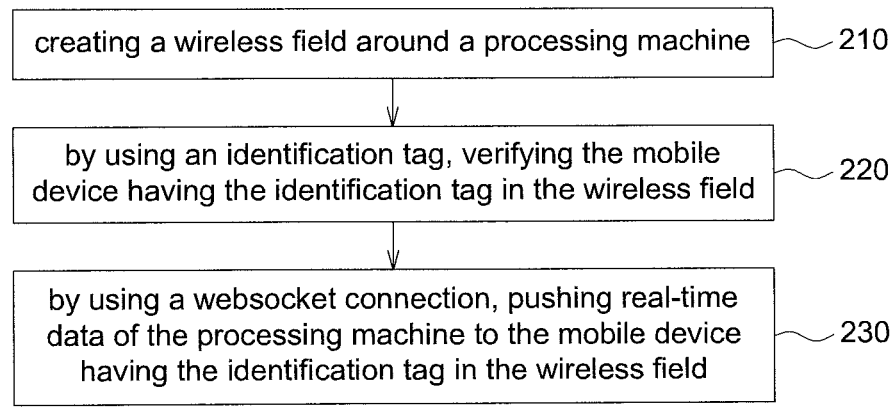
FIG. 4 is a flow chart illustrating a location based situation awareness method in accordance with an embodiment of the present disclosure.
Figure 5:
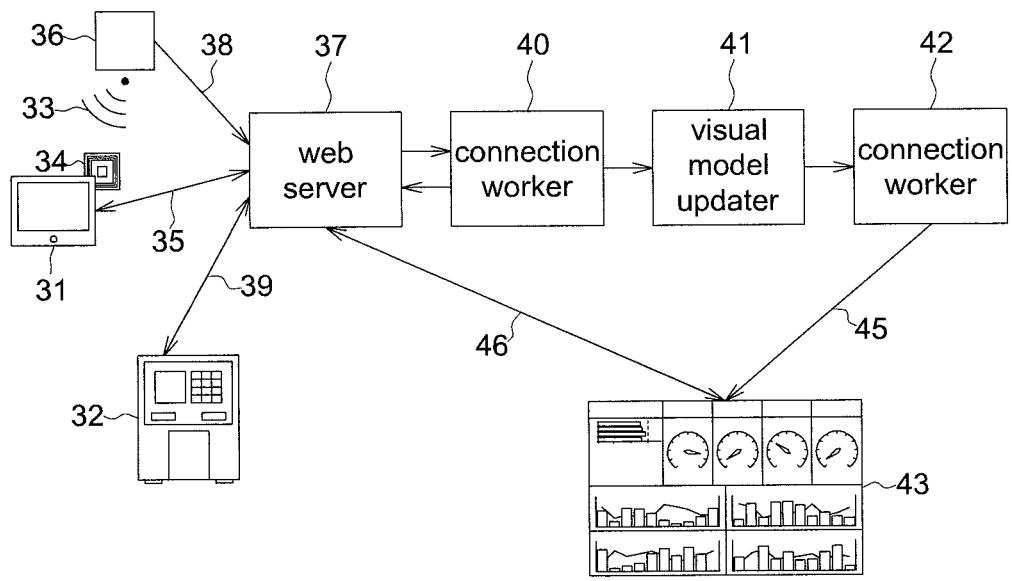
FIG. 5 is a framework diagram illustrating the location based situation awareness method in accordance with an embodiment of the present disclosure.

FIG. 4 is a flow chart illustrating a location based situation awareness method 200 in accordance with an embodiment of the present disclosure. FIG. 5 is a framework diagram illustrating the location based situation awareness method 200 in accordance with an embodiment of the present disclosure. Referring to FIG. 4 and FIG. 5, a location based situation awareness method 200 is adapted to a processing machine 32 monitored by a mobile device 31. The location based situation awareness method 200 comprises: creating a wireless field 33 around the processing machine 32 (step 210); by using an identification tag 34, verifying the mobile device 31 having the identification tag 34 in the wireless field 33 (step 220); and by using a websocket connection 35, pushing real-time data of the processing machine 32 to the mobile device 31 having the identification tag 34 in the wireless field 33 (step 230).

Referring to FIG. 5, in an embodiment, the location based situation awareness method 200 further comprises creating a websocket connection 38 between an interrogator 36 and a web server 37. In an embodiment, the location based situation awareness method 200 further comprises transmitting a location information of the identification tag 34 to the web server 37. When the mobile device 31 that the identification tag 34 attached to enters the wireless field 33, the interrogator 36 scans the identification tag 34. The interrogator 36 returns the location information and identity information of the identification tag 34 to the web server 37. The interrogator 36 informs the web server 37 of which processing machine 32 that the mobile device 31 currently locates in.

In an embodiment, the location based situation awareness method 200 further comprises creating a websocket connection 39 between the processing machine 32 and the web server 37. In an embodiment, the location based situation awareness method 200 further comprises updating the real-time data of the processing machine 32 to the web server 37. Through the websocket connection 39, the real-time data of the processing machine 32 may transmit to the web server 37 at all times.

In an embodiment, the location based situation awareness method 200 further comprises: by using a connection worker 40, filtering real-time data of the processing machine 32. The connection worker 40 examines whether the real-time data received by the web server 37 is damaged or not. The connection worker 40 will remove corrupted data. Further, the connection worker 40 assists the web server 37 to transmit real-time data. The connection worker 40 guides the real-time data to enter the web server 37.

In an embodiment, the location based situation awareness method 200 further comprises: by using a visual model updater 41, transforming the real-time data of the processing machine 32 into a human machine interface (HMI) 43. The human machine interface 43 comprises dashboards, bar graphs, and line graphs. The human machine interface 43 is established on at least one web page. The human machine interface 43 displays process conditions of the processing machine 32. The graphical data of the human machine interface 43 facilitates users to monitor the processing machine 32. In addition, the visual model updater 41 updates the human machine interface 43 nonstop in response to status of the processing machine 32.

In an embodiment, the location based situation awareness method 200 further comprises: by using a connection worker 42, distributing the human machine interface 43 of the processing machine 32 to the mobile device 31 having the identification tag 34 in the wireless field 33. In an embodiment, by using a websocket connection 45 through an ethernet, the human machine interface 43 is transmitted to the mobile device 31. In an embodiment, there is a hypertext transfer protocol connection 46 between the human machine interface 43 and the web server 37 via the ethernet. In addition, the hypertext transfer protocol connection 46 provides a bilateral communication between the human machine interface 43 and the web server 37. By using the hypertext transfer protocol connection 46, the users may give a command to the processing machine 32 through the human machine interface 43. Further, the processing machine 32 may reply some information to the human machine interface 43.

In an embodiment, the location based situation awareness method 200 further comprises: when the identification tag 34 moves to another wireless field, redirecting at least one web page of the mobile device 31 having the identification tag 34. In an embodiment, the location based situation awareness method 200 further comprises: pushing real-time data of a corresponding processing machine in another wireless field to the mobile device 31 having the identification tag 34 in another wireless field. In other words, when the mobile device 31 moves to another wireless field of a corresponding processing machine. The web server 37 redirects web pages of the mobile device 31. The web server 37 automatically pushes graphical real-time data of the corresponding processing machine to the mobile device 31. Users may monitor processing machines where they arrive without manually connecting the processing machines or manually changing the web pages.

Figure 6:
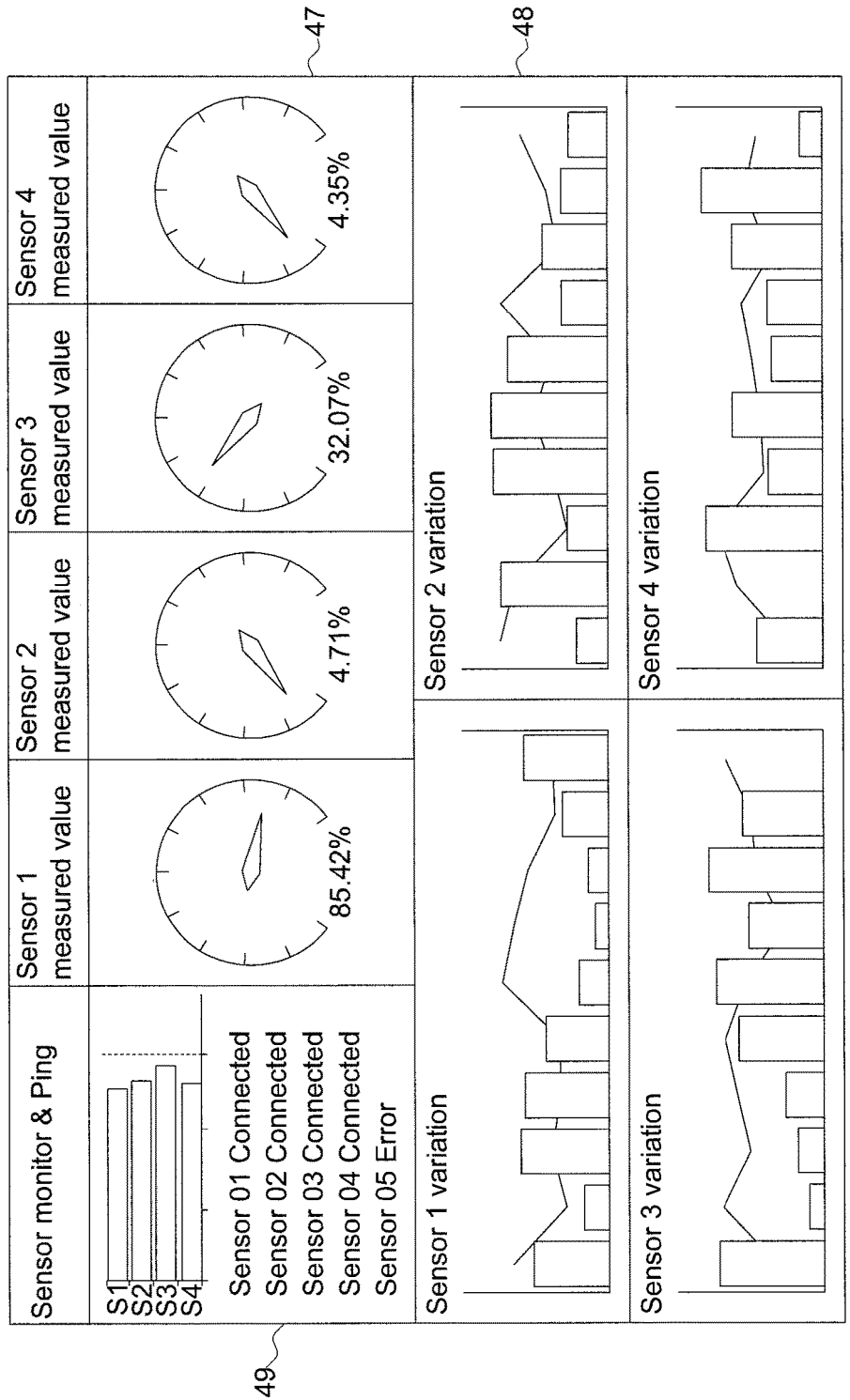
FIG. 6 is a diagram illustrating a human machine interface (HMI) in accordance with an embodiment of the present disclosure

FIG. 6 is a diagram illustrating the human machine interface (HMI) 43 in accordance with an embodiment of the present disclosure. The human machine interface 43 corresponds to real-time data of processing machines. For example, a dashboard 47 shows processing parameters. A bar graph 48 shows a relationship between parameters and time. A light signal 49 shows conditions of processing machines. The human machine interface 43 is constantly updated and changed to reflect status of processing machines. The human machine interface 43 is made of web page languages, which is compatible with browsers of mobile devices. When a mobile device enters a wireless field of a processing machine, the web server 37 actively converts browsers into a human machine interface 43 corresponding to the processing machine. Contents of the human machine interface 43 are automatically refreshed or switched as the identification tag 34 moves between processing machines. In an embodiment, the human machine interface 43 is capable of conforming to various sizes of mobile devices. Sizes of dashboards, bar graphs, and fonts are based on sizes of screens of mobile devices.

In an embodiment, the location based situation awareness system and the method thereof comprises: by using a wireless sensing technology (which may be, but not limited to such as radio frequency identification "RFID", Bluetooth, and near field communication "NFC"), a mode-matching algorithm for wireless sensing signals, message perception, and delivery mechanism, a network for location based situation awareness is established in production lines. When a handheld mobile device approaches the network, interrogators of the location based situation awareness system scan and detect the position and the direction of the mobile device. Later, information of processing machines in the production lines is pushed to web pages of the mobile devices. Active awareness for status of processing machines and instant visualization for operation may be achieved, which is adapted to a variety of processes, navigation, and similar application scenarios.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

| | | | |
|---|---|---|---|
| 11 | mobile device | 12 | processing machine |
| 15 | antenna | 16 | wireless field |
| 17 | interrogator | 18 | identification tag |
| 19 | data collector | 20 | broker server |
| 22 | websocket connection | 23 | websocket connection |
| 24 | websocket connection | 25 | web server |
| 26 | message distributor | 27 | connection worker |
| 28 | visual model updater | 29 | connection worker |
| 31 | mobile device | 32 | processing machine |
| 33 | wireless field | 34 | identification tag |
| 35 | websocket connection | 36 | interrogator |
| 37 | web server | 38 | websocket connection |
| 39 | websocket connection | 40 | connection worker |
| 41 | visual model updater | 42 | connection worker |
| 43 | human machine interface | 45 | websocket connection |
| 46 | hypertext transfer protocol connection | 47 | dashboard |
| 48 | bar graph | 49 | light signal |
| 100 | location based situation awareness system | 200 | location based situation awareness method |
| 210, 220, 230 | step | | |

What is claimed is:

1. A location based situation awareness system adapted to a processing machine monitored by a mobile device, comprising:

an antenna located on the processing machine, the antenna is configured to generate a wireless field;

an interrogator coupled to the antenna;

an identification tag located on the mobile device, the interrogator is configured to scan the identification tag in the wireless field;

a data collector located on the processing machine, the data collector is configured to collect a real-time data of the processing machine; and a broker server coupled to the interrogator and the data collector, the broker server is configured to update the real-time data of the processing machine into the mobile device having the identification tag in the wireless field;

wherein the broker server further comprises: a message distributor coupled to the data collector and the interrogator, the message distributor being configured to receive the real-time data of the processing machine and to distribute the real-time data into the mobile device having the identification tag in the wireless field.

2. The location based situation awareness system according to claim 1, wherein the broker server further comprises:
an ethernet interface, the ethernet interface is configured to connect an ethernet.

3. The location based situation awareness system according to claim 1, wherein the broker server is based on a websocket communication protocol.

4. The location based situation awareness system according to claim 1, wherein the broker server further comprises:
a web server coupled to the data collector and the interrogator, wherein the web server is configured to provide at least one web page to the mobile device having the identification tag in the wireless field.

5. The location based situation awareness system according to claim 4, wherein the at least one web page comprises a human machine interface, and the human machine interface corresponds to the real-time data of the processing machine.

6. The location based situation awareness system according to claim 1, wherein the broker server further comprises:
a connection worker located between the message distributor and the data collector, wherein the connection worker is configured to filter and transmit the real-time data into the message distributor.

7. The location based situation awareness system according to claim 1, wherein the broker server further comprises:
a visual model updater coupled to the data collector, wherein the visual model updater is configured to transform the real-time data into a human machine interface.

8. The location based situation awareness system according to claim 7, wherein the broker server further comprises:
a connection worker located between the mobile device having the identification tag and the message distributor, wherein the connection worker is configured to transmit the human machine interface to the mobile device having the identification tag in the wireless field.

9. The location based situation awareness system according to claim 1, wherein the identification tag is a radio frequency identification tag.

10. The location based situation awareness system according to claim 1, wherein the data collector further comprises:
an ethernet interface, wherein the ethernet interface is configured to connect an ethernet; and
at least one sensor, wherein the at least one sensor is configured to retrieve the real-time data.

11. The location based situation awareness system according to claim 1, wherein the interrogator is configured to inform the broker server about a location information of the identification tag.

12. A location based situation awareness method adapted to a processing machine monitored by a mobile device, comprising:
creating a wireless field around the processing machine;
by using an identification tag, verifying the mobile device having the identification tag in the wireless field;
by using a message distributor, receiving a real-time data of the processing machine and distributing the real-time data into the mobile device having the identification tag in the wireless field; and
by using a websocket connection, pushing the real-time data of the processing machine to the mobile device having the identification tag in the wireless field.

13. The location based situation awareness method according to claim 12, further comprising:
creating a websocket connection between an interrogator and a web server.

14. The location based situation awareness method according to claim 13, further comprising:
transmitting a location information of the identification tag to the web server.

15. The location based situation awareness method according to claim 12, further comprising:
creating a websocket connection between the processing machine and a web server.

16. The location based situation awareness method according to claim 15, further comprising:
updating the real-time data of the processing machine to the web server.

17. The location based situation awareness method according to claim 12, further comprising:
by using a connection worker, filtering the real-time data of the processing machine.

18. The location based situation awareness method according to claim 12, further comprising:
by using a visual model updater, transforming the real-time data of the processing machine into a human machine interface.

19. The location based situation awareness method according to claim 18, further comprising:
by using a connection worker, distributing the human machine interface of the processing machine to the mobile device having the identification tag in the wireless field.

20. The location based situation awareness method according to claim 12, further comprising:
when the identification tag moves to another wireless field, redirecting changing at least one web page of the mobile device having the identification tag.

21. The location based situation awareness method according to claim 20, further comprising:
pushing a real-time data of a corresponding processing machine in the another wireless field to the mobile device having the identification tag in the another wireless field.

* * * * *